(12) United States Patent
Kato et al.

(10) Patent No.: US 7,567,405 B2
(45) Date of Patent: Jul. 28, 2009

(54) SERVO INFORMATION RECORDING DEVICE AND SERVO INFORMATION RECORDING METHOD

(75) Inventors: Toshiya Kato, Kawasaki (JP); Masanori Fukushi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 11/650,727

(22) Filed: Jan. 8, 2007

(65) Prior Publication Data

US 2008/0043364 A1 Feb. 21, 2008

(30) Foreign Application Priority Data

Aug. 16, 2006 (JP) .............................. 2006-221965

(51) Int. Cl.
*G11B 20/20* (2006.01)
*G11B 21/02* (2006.01)

(52) U.S. Cl. ..................... 360/76; 360/75; 360/266.1

(58) Field of Classification Search ....................... None
See application file for complete search history.

(56) References Cited

U.S. PATENT DOCUMENTS 4,692,821 A * 9/1987 Zenzefilis ................. 360/78.08
4,926,275 A * 5/1990 Kuno et al. .................. 360/244
6,954,323 B2 * 10/2005 Deeman et al. ............... 360/51
2003/0142435 A1 * 7/2003 Tomiyama et al. ............ 360/75

FOREIGN PATENT DOCUMENTS

JP        56-127980       10/1981
JP        10-208411        8/1998

* cited by examiner

*Primary Examiner*—Jason C Olson
(74) *Attorney, Agent, or Firm*—Greer, Burns & Crain, Ltd.

(57) ABSTRACT

There is provided a servo information recording device having a simple structure, being implementable in lower cost, and capable of writing servo information with high reliability and a servo information recording method. The servo information recording device includes a head swingably supported relative to a predetermined swing axis and a head drive section that swings the head within a predetermined zone in the radial direction of the disk medium. The device also has a controller that controls the head drive section and writes the servo information onto a track of the disk medium. Assuming that R is the outer circumferential radius of the disk medium and P is a distance between the center of the disk medium and pivot (swing axis), the swing axis is disposed at a position at which P/R falls beyond about 1.35.

7 Claims, 6 Drawing Sheets

SERVO INFORMATION RECORDING DEVICE AND SERVO INFORMATION RECORDING METHOD

BACKGROUND OF THE INVENTION

1. Field of the Invention

The present invention relates to a servo information recording device (Servo Track Writer (STW)) that records servo information for positioning a head of a magnetic disk unit to a desired track and a servo information recording method. In this specification, a rotational motion with a rotation angle of less than 360° is expressed as "swing".

2. Description of the Related Art

A positional relationship between a magnetic disk (recording medium) and an actuator (head drive section) that drives a head defined in a known typical STW is configured to be the same as that defined in a magnetic disk unit in which the magnetic disk is set.

In such a conventional STW, YAW angle, which is an angle (quantity) formed between the head swing (rotation) radial direction and disk medium rotation circumferential direction, exceeds its ideal value in at least one of the radial direction inside and outside of a servo information writing zone on the magnetic disk. Further, YAW angle greatly differs between the radial direction inside and outside of the servo information writing zone.

A cause of the above defects is that the direction of line connecting two points at which the head swinging trajectory crosses the radial direction inside and outside of the servo information writing zone on the magnetic disk is significantly displaced from the radial direction of the magnetic disk.

Writing operation of the conventional STW is performed as follows. A controller creates servo information corresponding to R-position of an actuator on one track of the disk medium by one rotation and starts writing the servo information at a constant reference phase of the disk medium (same timing for each rotation cycle).

In this case, the reference phase stays constant relative to all tracks. After completion of the writing operation corresponding to one rotation, the controller moves the actuator to the next track and repeats the same operation as above.

As a prior art relating to the present invention, there is known a configuration in which the storage surfaces of a plurality of stacked magnetic disk are divided into a plurality of concentric, circular storage zones and two magnetic heads having different arm lengths. In this configuration, two magnetic heads are switched in such a way that longer arm is used for the inner circumferential side (refer to, e.g., Patent Document 1: Jpn. Pat. Appln. Laid-Open Publication No. 10-208411).

In a generally known STW, YAW angle exceeds its ideal value in one of the radial direction inside and outside of the writing zone on a magnetic disk, so that a side erase phenomenon, which depends on YAW angle of a head, becomes prominent in one of the radial direction inside and outside. This side erase brings about level down of servo information. For example, in the case where servo information is written starting from the radial direction inside of the magnetic disk, the side erase phenomenon becomes strongly apparent in the servo information writing end zone (i.e., radial direction outside). On the other hand, in the case where servo information is written starting from the radial direction outside of the magnetic disk, the side erase phenomenon becomes strongly apparent in the radial direction inside.

The servo information writing zone of the STW is wider, by the amount of parts tolerance and disk eccentricity, than that used in a magnetic disk unit. Thus, YAW angle of the head of the STW correspondingly becomes large in both ends of the writing zone, with the result that the levitation margin of the head becomes smaller than that in the magnetic disk unit. It follows that the side erase of the servo information easily occurs, thus deteriorating the quality of the servo information.

Further, in the STW, in order to make the trajectory of servo information (head) recorded onto a magnetic disk corresponding to the swinging trajectory of a head of a magnetic disk unit, a distance between the disk rotation center and pivot (swing axis) and distance between the pivot and head are made corresponding to those set in the magnetic disk unit. Therefore, manufacturing of a new magnetic disk unit having a different positional configuration requires a dedicated STW and its actuator assembly facility, resulting in increased cost.

Further, in the technique of above Patent Document 1, a plurality of heads having different arm lengths need to be prepared. This increases the size and complexity of the device, also resulting in increased cost.

SUMMARY OF THE INVENTION

The present invention has been made to solve the above problem, and an object thereof is to provide a servo information recording device having a simple structure, being implementable in lower cost, and capable of writing servo information with high reliability and a servo information recording method.

To solve the above problems, according to a first aspect of the present invention, there is provided a servo information recording device that writes servo information onto a disk medium, comprising: a head swingably supported relative to a predetermined swing axis; a head drive section that swings the head within a predetermined zone in the radial direction of the disk medium; and a controller that controls the head drive section and writes the servo information onto a track of the disk medium, wherein assuming that R is the outer circumferential radius of the disk medium and P is a distance between the center of the disk medium and pivot (swing axis), the swing axis is disposed at a position at which P/R falls beyond about 1.35.

In the servo information recording device according to the present invention, the controller starts writing the servo information onto the track from a position offset from a predetermined reference phase of the disk medium in the rotation circumferential direction thereof by the amount corresponding to a phase difference between the trajectories of a head of the servo information recording device and a head of the magnetic disk unit in which a disk medium onto which the servo information has been written by the servo information recording device is set.

According to a second aspect of the present invention, there is provided a servo information recording device that writes servo information onto a disk medium, comprising: a head swingably supported relative to a predetermined swing axis; a head drive section that swings the head within a predetermined zone in the radial direction of the disk medium; and a controller that controls the head drive section and writes the servo information onto a track of the disk medium, in which the swing axis of the head is disposed at the position at which the angle (YAW angle) formed between the rotation radius direction of the head and rotation circumferential direction of the disk medium becomes smaller than the angle (YAW angle) defined in the magnetic disk unit at both outside position in the radial direction of the disk medium and inside position in the radial direction thereof in the predetermined zone.

In the servo information recording device according to the present invention, the controller starts writing the servo information onto the track from a position offset from a predetermined reference phase of the disk medium in the rotation circumferential direction thereof by the amount corresponding to a phase difference between the trajectories of a head of the servo information recording device and a head of the magnetic disk unit in which a disk medium onto which the servo information has been written by the servo information recording device is set.

The servo information recording device according to the present invention is a single-plate servo information recording device that previously writes servo information onto a magnetic disk used in a magnetic disk unit.

According to a third aspect of the present invention, there is provided a servo information recording method that writes servo information onto a disk medium at predetermined phase intervals while swingably supporting a head about a predetermined swing axis and swinging the head within a predetermined zone in the radial direction of the disk medium, wherein assuming that R is the outer circumferential radius of the disk medium and P is a distance between the center of the disk medium and pivot (swing axis), the swing axis is disposed at a position at which P/R falls beyond about 1.35, and writing operation of the servo information onto the track is started from a position offset from a predetermined reference phase of the disk medium in the rotation circumferential direction thereof by the amount corresponding to a phase difference between the trajectories of a head of the servo information recording device and a head of the magnetic disk unit in which a disk medium onto which the servo information has been written by the servo information recording device is set.

According to a fourth aspect of the present invention, there is provided a servo information recording method that writes servo information onto a disk medium at predetermined phase intervals while swingably supporting a head about a predetermined swing axis and swinging the head within a predetermined zone in the radial direction of the disk medium, in which the swing axis of the head is disposed at the position at which the angle (YAW angle) formed between the rotation radius direction of the head and rotation circumferential direction of the disk medium becomes smaller than the angle (YAW angle) defined in the magnetic disk unit at both outside position in the radial direction of the disk medium and inside position in the radial direction thereof in the predetermined zone, and writing operation of the servo information onto the track is started from a position offset from a predetermined reference phase of the disk medium in the rotation circumferential direction thereof by the amount corresponding to a phase difference between the trajectories of a head of the servo information recording device and a head of the magnetic disk unit in which a disk medium onto which the servo information has been written by the servo information recording device is set.

According to the present invention, a servo information recording device having a simple structure, being implementable in lower cost, and capable of writing servo information with high reliability and a servo information recording method can be provided.

DETAILED DESCRIPTION OF THE PREFERRED EMBODIMENTS

An embodiment of the present invention will be described below with reference to the accompanying drawings.

Figure 1:
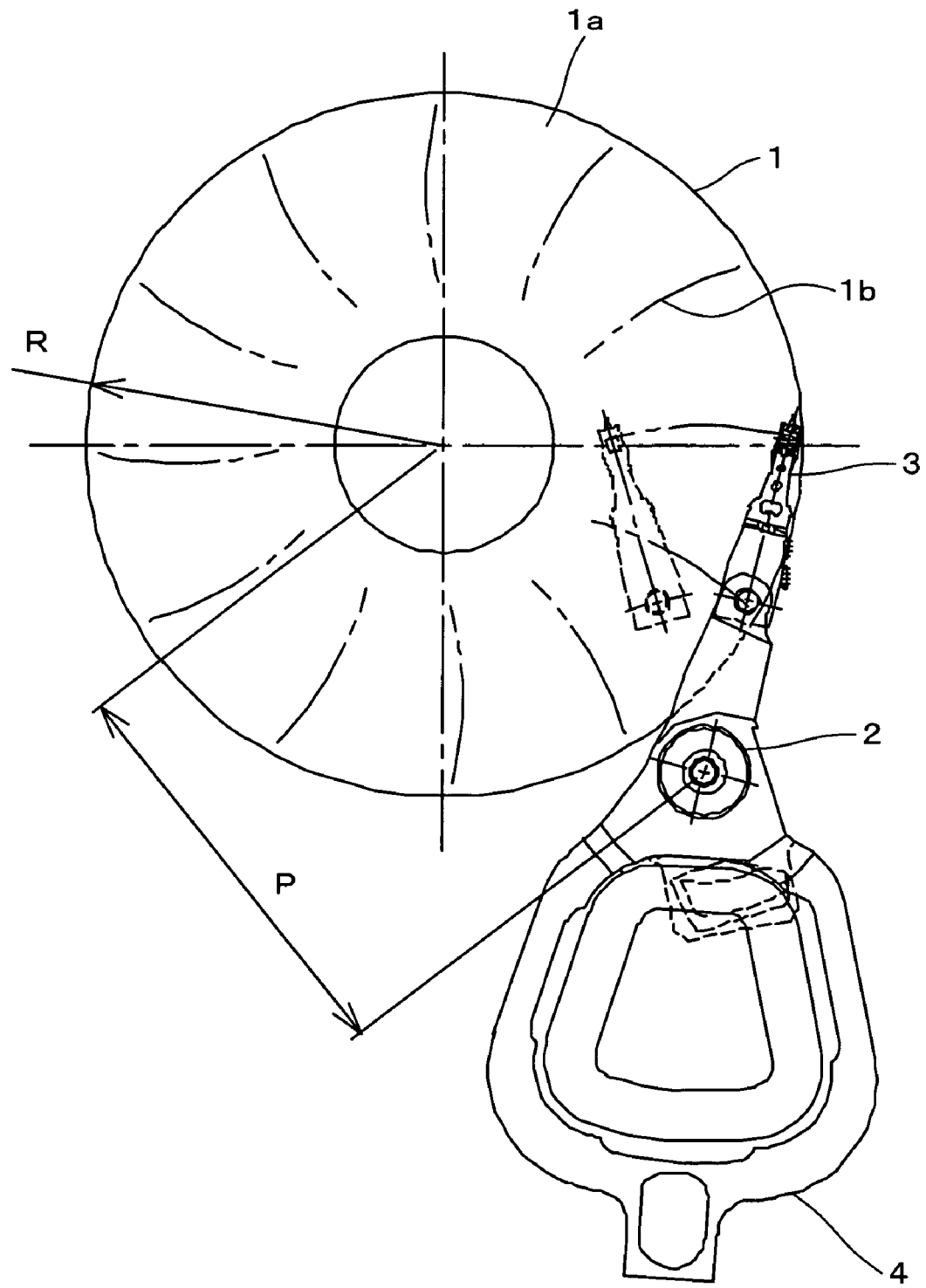
FIG. 1 is a schematic plan view showing a first embodiment of the present invention.
Figure 2:
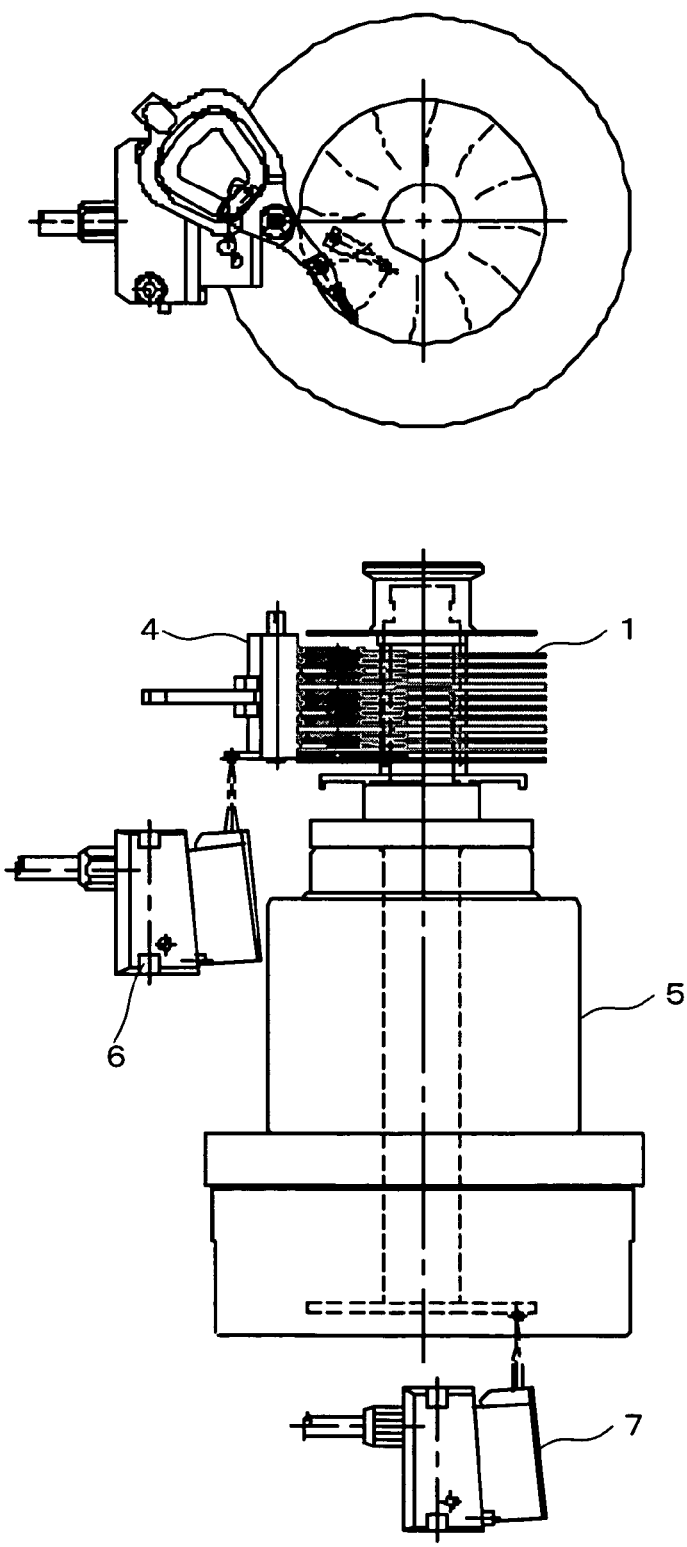
FIG. 2 is a schematic side view showing the embodiment.
Figure 3:
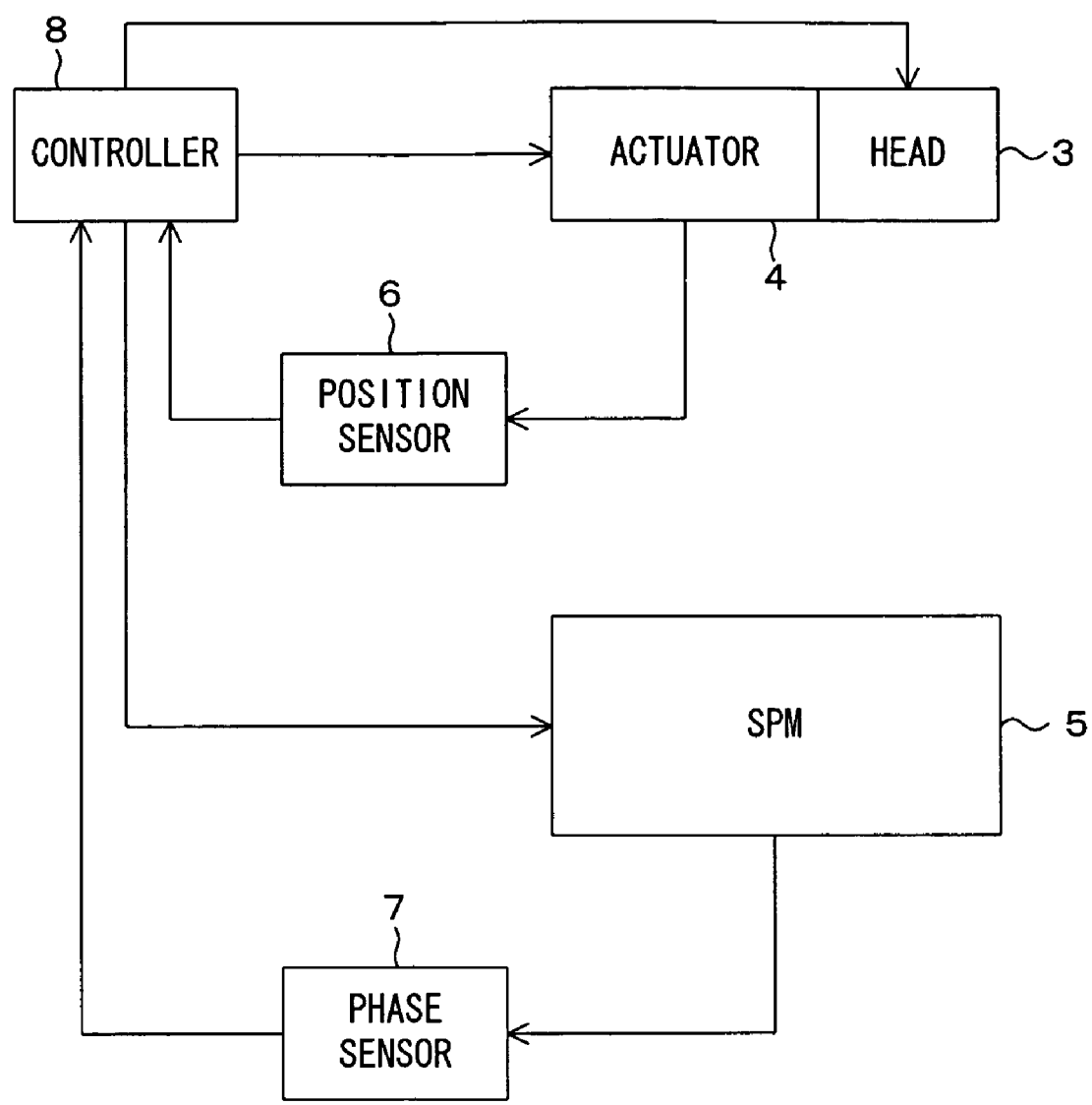
FIG. 3 is a control block diagram of the embodiment.

FIG. 1 is a schematic plan view showing a first embodiment of the present invention, FIG. 2 is a schematic side view showing the first embodiment, and FIG. 3 is a control block diagram.

A servo information device according to the present invention will be described below, taking a single-plate STW as an example. The single-plate STW is a device that previously records (writes) servo information onto a magnetic disk used in a not shown magnetic disk unit using a dedicated servo information recording device (servo information writing device) that differs from the magnetic disk unit. The single-plate STW includes a head 3 which is supported by a pivot 2 serving as a predetermined swing axis so as to be swingable relative to a disk-shaped magnetic disk 1, an actuator (head drive section) 4 that swings the head 3 within a predetermined zone (servo information writing zone 1a) in the radial direction of the magnetic disk 1, a spindle motor 5 that rotates the magnetic disk 1, non-contact type position and phase sensors 6 and 7 that acquire drive position information of the actuator 4 and rotation phase information of the spindle motor respectively, and a controller 8 that controls the drive of the actuator 4 and generates/writes servo information based on the information from the sensors 6 and 7. In FIG. 1, reference numeral 1b indicates the servo information writing position.

In the above configuration, the pivot 2 serving as the swing axis of the head 3 is disposed at the position at which P/R falls between about 1.25 to 2.0, where P is a distance between the center of the magnetic disk 1 and pivot 2 and R is the outer circumferential radius of the magnetic disk 1, as shown in FIG. 1. In this example, the pivot 2 is disposed at the position at which P/R=1.43. Note that effective range of P/R value for the STW is between about 1.35 and 2.0.

Figure 4:
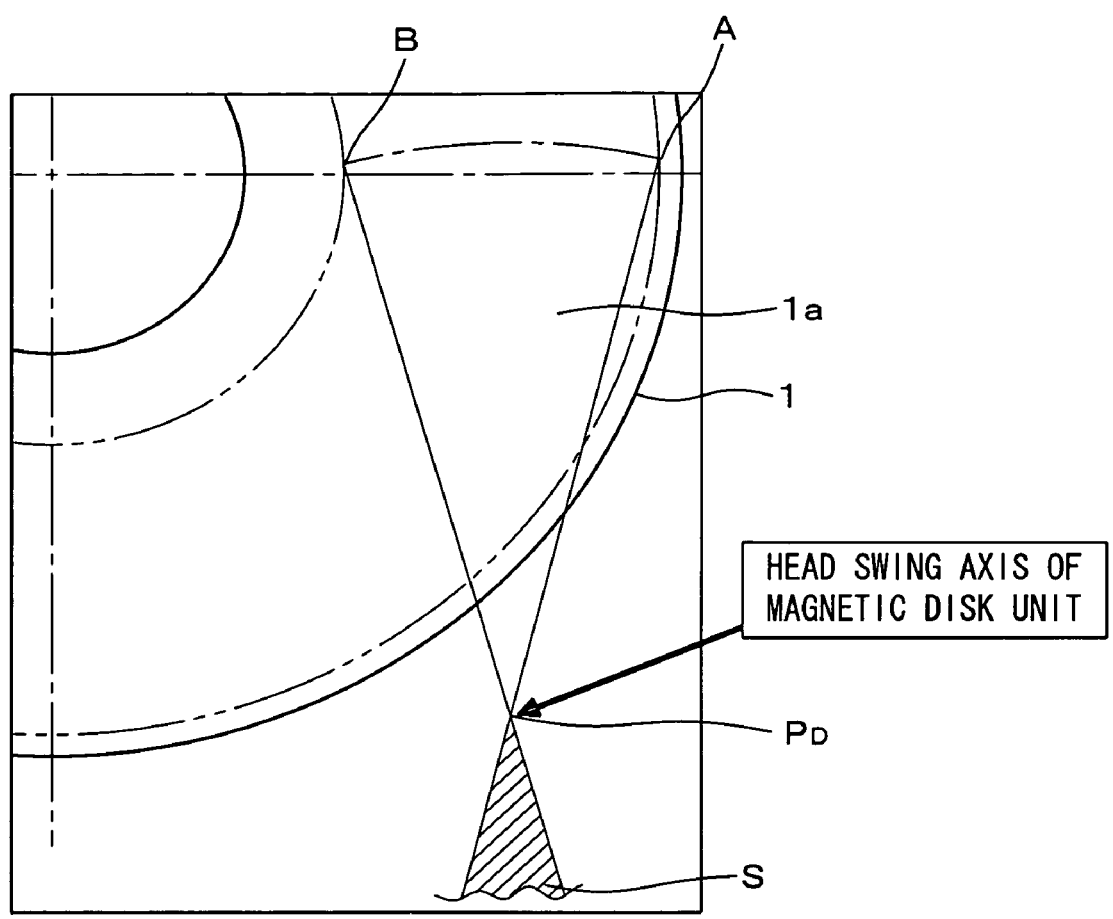
FIG. 4 is a view showing the position of a pivot of a single-plate STW in the present embodiment using a relationship with a pivot of a magnetic disk unit.
Figure 5:
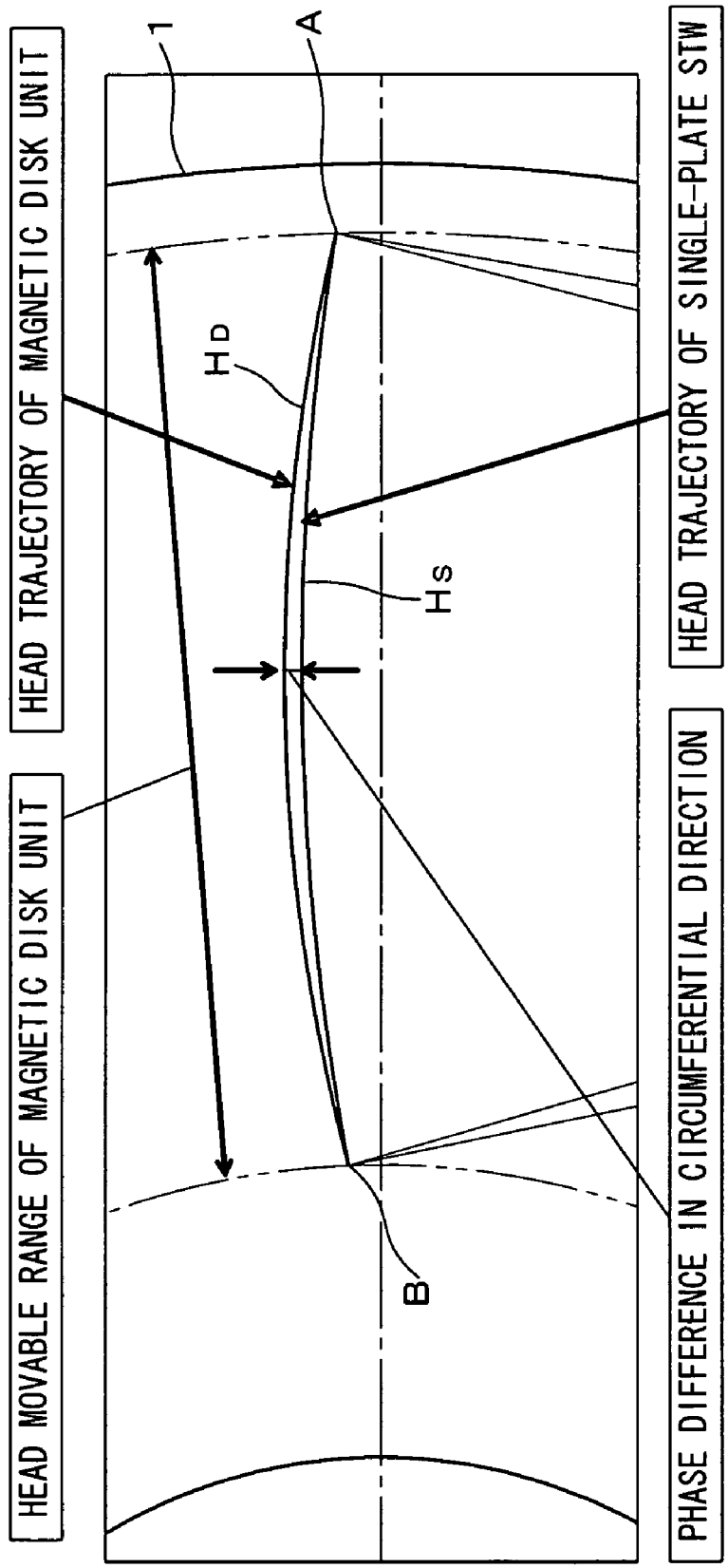
FIG. 5 is a view showing the head trajectory of the single-plate STW in comparison with that of the magnetic disk unit.

The position of the pivot 2 is provided at the location (area) indicated by S of FIG. 4. Within this area, the angle (YAW angle) formed between the rotation radius direction of the head 3 and rotation circumferential direction of the magnetic disk 1 becomes smaller than the YAW angle (angle formed between the rotation radius direction of the head and rotation circumferential direction of the magnetic disk in the magnetic disk unit) defined in the magnetic disk unit at both positions A (outside position in the radial direction of the magnetic disk) and B (inside position in the radial direction of the magnetic disk) in the servo information writing zone 1a. In FIG. 4, $P_D$ indicates the swing axis (pivot) of the head of the magnetic disk unit. Thus, the head trajectory $H_S$ of the single-plate STW and head trajectory $H_D$ of the magnetic disk unit in the present embodiment become as shown in FIG. 5.

Then, as described later, the controller 8 starts writing servo information onto all tracks formed within the servo information writing zone 1a of the magnetic disk 1 from a position offset by a predetermined phase amount (phase deference between $H_S$ and $H_D$ of FIG. 5) from a predetermined reference phase position in the rotational circumferential direction of the magnetic disk 1.

Figure 6:
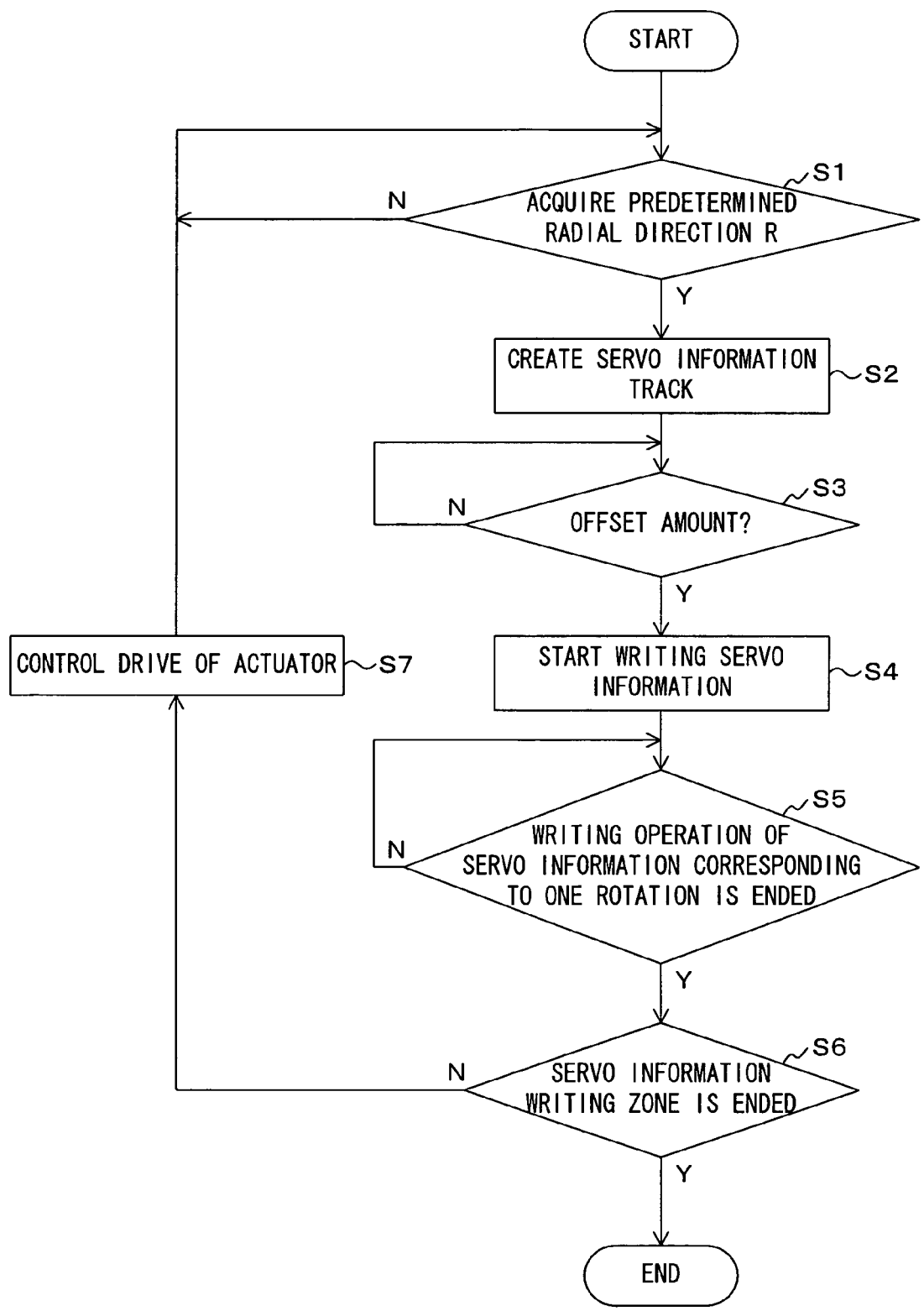
FIG. 6 is a flowchart showing the operation of a controller in the present embodiment.

FIG. 6 is a flowchart showing the operation of the controller. After acquiring the radial direction position of the actuator on the magnetic disk (track formation position) using the position sensor 6 (Y in S1), the controller creates servo information corresponding to the acquired position by one rotation of a track (S2).

Then, the controller starts writing the created servo information onto the track from its reference phase position with a predetermined offset amount ((Y in S3) and (S4)). The predetermined offset amount corresponds to a distance offset from a predetermined reference phase position in the rotational circumferential direction of the magnetic disk 1 (disk medium) by the amount corresponding to the phase difference between the trajectories of the head 3 of the servo information recording device according to the present embodiment and head of the magnetic disk unit in which the disk 1 onto which the servo information has been written by the servo information recording device is set (i.e., phase difference between the head trajectories $H_S$ and $H_D$ shown in FIG. 5).

The above offset amount is previously stored in a table in the controller 8 in association with the tracks on the magnetic disk 1, and the controller 8 reads in the offset amount from the table in the operation of step S3. The controller 8 starts writing the servo information at the time point when the rotation phase of the magnetic disk 1 has reached the offset amount.

After the completion of the writing operation of the servo information corresponding to one rotation of the track (Y in S5), if the servo information writing zone is not ended (N in S6), the controller 8 moves the head 3 to the next track using the actuator 4 (S7) and returns to step S1. If the servo information writing zone is ended (Y in S6), the controller 8 terminates this flow.

According to the present embodiment, it is possible to use an actuator that meets the abovementioned relationship between R (outer circumferential radius of the magnetic disk) and P (distance between the center of the magnetic disk and pivot) in the single-plate STW. As a result, the following advantages can be obtained.

(1) YAW angle of the STW head at the servo information writing end area becomes smaller to reduce the level down due to occurrence of a side erase phenomenon.

(2) YAW angle of the STW head at both ends (outer and inner edge) of the servo information writing zone of the single-plate STW becomes smaller to increase the levitation margin of the STW head.

(3) All the existing actuators that meet the abovementioned relationship can be used for a magnetic disk unit having a reduced size (diameter), eliminating the need for any additional investment in facilities to thereby reduce cost.

(4) The servo information is written with predetermined offset amounts corresponding to the respective tracks set with respect to the reference phase of a disk medium. As a result, in the case where a disk medium onto which the servo information has been recorded by the servo information recording device according to the present invention is used in a conventional magnetic disk unit, it is not necessary for the conventional magnetic disk unit to perform seek operation associated with the trajectory phase difference between a head of the servo information recording device and a head of the conventional magnetic disk unit. Thus, writing and reading operations in the magnetic disk unit can be effectively performed.

In the present embodiment, the above-mentioned offset amount may be set for all tracks or only a part of tracks based on the trajectory phase difference between the head 3 of the servo information recording device and a head of the magnetic disk unit. Further, if the improvement in the operation efficiency described in the above (4) is ignored, setting of the offset amount need not be made and, in this case, the writing of the servo information onto respective tracks may be started with an identical reference phase.

Although the magnetic disk is used as a disk medium in the present embodiment, it goes without saying that the present invention can be applied to any type of recording medium such as an optical disk, as long as it records the servo information using a swinging head.

What is claimed is:

1. A servo information recording device that writes servo information onto a disk medium, comprising:
   a head swingably supported relative to a predetermined swing axis;
   a head drive section that swings the head within a predetermined zone in the radial direction of the disk medium; and
   a controller that controls the head drive section and writes the servo information onto a track of the disk medium, wherein
   assuming that R is the outer circumferential radius of the disk medium and P is a distance between the center of the disk medium and the swing axis, the swing axis is disposed at a position at which P/R is greater than or equal to 1.35.

2. A servo information recording device that writes servo information onto a disk medium, comprising:
   a head swingably supported relative to a predetermined swing axis;
   a head drive section that swings the head within a predetermined zone in the radial direction of the disk medium; and
   a controller that controls the head drive section and writes the servo information onto a track of the disk medium, wherein
   assuming that R is the outer circumferential radius of the disk medium and P is a distance between the center of the disk medium and the swing axis, the swing axis is disposed at a position at which P/R is greater than or equal to 1.35; and
   the controller starts writing the servo information onto the track from a position offset from a predetermined reference phase of the disk medium in the rotation circumferential direction thereof by an amount corresponding to a phase difference between the trajectories of the head of the servo information recording device and a head of a magnetic disk unit in which a disk medium onto which the servo information has been written by the servo information recording device is set.

3. A servo information recording device that writes servo information onto a disk medium, comprising:
   a head swingably supported relative to a predetermined swing axis;

a head drive section that swings the head within a predetermined zone in the radial direction of the disk medium; and a controller that controls the head drive section and writes the servo information onto a track of the disk medium, wherein the swing axis of the head is disposed at a position at which an angle formed between the rotation radius direction of the head and rotation circumferential direction of the disk medium becomes smaller than an angle defined in a magnetic disk unit at both an outside position in the radial direction of the disk medium and an inside position in the radial direction thereof in the predetermined zone.

4. A servo information recording device that writes servo information onto a disk medium, comprising:

a head swingably supported relative to a predetermined swing axis;

a head drive section that swings the head within a predetermined zone in the radial direction of the disk medium; and a controller that controls the head drive section and writes the servo information onto a track of the disk medium, wherein the swing axis of the head is disposed at a position at which an angle formed between the rotation radius direction of the head and rotation circumferential direction of the disk medium becomes smaller than an angle defined in a magnetic disk unit at both an outside position in the radial direction of the disk medium and an inside position in the radial direction thereof in the predetermined zone; and the controller starts writing the servo information onto the track from a position offset from a predetermined reference phase of the disk medium in the rotation circumferential direction thereof by an amount corresponding to a phase difference between the trajectories of the head of the servo information recording device and a head of the magnetic disk unit in which a disk medium onto which the servo information has been written by the servo information recording device is set.

5. The servo information recording device according to claim 1, wherein the servo information recording device is a single-plate servo information recording device that previously writes servo information onto a magnetic disk used in a magnetic disk unit.

6. A servo information recording method that writes servo information onto a disk medium at predetermined phase intervals while swingably supporting a head about a predetermined swing axis and swinging the head within a predetermined zone in the radial direction of the disk medium, wherein assuming that R is the outer circumferential radius of the disk medium and P is a distance between the center of the disk medium and the swing axis, the swing axis is disposed at a position at which P/R is greater than or equal to 1.35, and writing operation of the servo information onto the track is started from a position offset from a predetermined reference phase of the disk medium in the rotation circumferential direction thereof by an amount corresponding to a phase difference between the trajectories of the head of the servo information recording device and a head of a magnetic disk unit in which a disk medium onto which the servo information has been written by the servo information recording device is set.

7. A servo information recording method that writes servo information onto a disk medium at predetermined phase intervals while swingably supporting a head about a predetermined swing axis and swinging the head within a predetermined zone in the radial direction of the disk medium, wherein the swing axis of the head is disposed at a position at which an angle formed between the rotation radius direction of the head and rotation circumferential direction of the disk medium becomes smaller than an angle defined in a magnetic disk unit at both an outside position in the radial direction of the disk medium and an inside position in the radial direction thereof in the predetermined zone, and writing operation of the servo information onto the track is started from a position offset from a predetermined reference phase of the disk medium in the rotation circumferential direction thereof by an amount corresponding to a phase difference between the trajectories of the head of the servo information recording device and a head of the magnetic disk unit in which a disk medium onto which the servo information has been written by the servo information recording device is set.

* * * * *